United States Patent [19]

Clarke

[11] Patent Number: 4,466,820
[45] Date of Patent: Aug. 21, 1984

[54] ELECTROLYSIS TREATMENT FOR DRAWING IONS OUT OF A CERAMIC

[75] Inventor: David R. Clarke, Cambridge, Mass.

[73] Assignee: Rockwell International Corporation, El Segundo, Calif.

[21] Appl. No.: 514,718

[22] Filed: Jul. 18, 1983

[51] Int. Cl.³ .............................................. C25F 1/00
[52] U.S. Cl. .................................. 65/30.14; 65/30.13; 204/130
[58] Field of Search ............. 204/130; 65/30.13, 30.14

[56] References Cited

U.S. PATENT DOCUMENTS

| | | | |
|---|---|---|---|
| 2,897,126 | 7/1959 | George | 204/130 |
| 3,607,177 | 9/1971 | Robinson | 65/30.13 |
| 3,811,855 | 5/1974 | Carlson et al. | 204/130 |
| 3,896,016 | 7/1975 | Goodman et al. | 204/130 |

Primary Examiner—R. L. Andrews
Attorney, Agent, or Firm—H. Fredrick Hamann; Craig O. Malin

[57] ABSTRACT

A method is provided for drawing ions out of the glassy phase of a ceramic in order to improve its high temperature strength and to reduce its dielectric loss. The ceramic is heated to a high temperature to increase the mobility of the ions within the glassy phase. An electric field is then applied across the ceramic to draw the ions to the surfaces of the ceramic where they can be removed by grinding.

3 Claims, 3 Drawing Figures

ELECTROLYSIS TREATMENT FOR DRAWING IONS OUT OF A CERAMIC

BACKGROUND OF THE INVENTION

This invention relates to the field of ceramics and particularly to ceramics having ionic impurities in a glassy phase.

Ceramic materials such as silicon nitride are frequently used for parts which require good high temperature strength, or low dielectric losses, or a combination of both high temperature strength and low dielectric losses. There is a continuing need to improve the properties of these ceramics so that they can be used more effectively at higher stresses and at higher temperatures.

Ceramics such as silicon nitride are generally prepared by mixing the ceramic powder with a densification aid and then hot pressing the mixture to form the densified ceramic. During hot pressing, the densification aid melts to form a liquid which, upon cooling, forms a glassy intergranular phase. Unfortunately, this glassy phase becomes viscous at high temperatures and causes a reduction in mechanical properties. The temperature at which degradation begins depends upon the composition of the glassy phase. The extent of degradation depends upon the volume fraction of the glassy phase. Within a given system, compositions containing a smaller volume fraction of glassy phase have a higher strength at high temperatures. However, compositions containing little or no glassy phase arae difficult or impossible to densify.

The glassy phase contains ionic impurities which are difficult to remove and ionic additives which promote the densification of the powder during fabrication. Unfortunately, these ions lower the melting point of the intergranular glassy phase, thus reducing its high temperature strength, and they reduce its dielectric properties particularly at high temperatures.

SUMMARY OF THE INVENTION

It is an object of the invention to provide a ceramic having good high temperature strength.

It is an object of the invention to provide a ceramic having low dielectric losses at high temperature.

It is an object of the invention to provide a method of drawing ions out of the glassy phase in a ceramic.

It is an object of the invention to provide a silicon nitride ceramic having improved strength and lowered dielectric losses at high temperatures.

According to the invention, ions are drawn out of the glassy phase of a ceramic by a high temperature electrolysis treatment. The ceramic is heated to a high temperature in order to increase the mobility of the ions within the glassy phase. An electric field is then applied across the ceramic. The anions in the glassy phase are attracted toward the surface of the ceramic on the positive side of the electric field and the cations are attracted to the opposite negative side. The temperature of the ceramic is returned to ambient and the electric field is removed. The surface of the ceramic can then be ground to remove the ions (or neutralized ions) which have been drawn out of the bulk of the ceramic.

These and other objects and features of the invention will be apparent from the following detailed description taken with reference to the accompanying drawings.

DESCRIPTION OF THE PREFERRED EMBODIMENT

Commercial ceramics have grains of crystalline materials surrounded by a non-crystalline (glassy) intergranular material. In the case of silicon nitride ceramics, the crystalline grains are a primary phase of silicon nitride. The silicon nitride grains have a high melting point, they constitute the bulk of the material, and they provide it with the desired high strength and low dielectric loss at high temperature. The glassy phase is non-crystalline (sometimes called a supercooled liquid) and has a lower melting (or softening) temperature than the grains of silicon nitride. It is a very thin, intergranular phase which occupies only a few percent of the total volume fraction of the material. The glassy phase is made up from impurities in the material and from additives used to densify the powders during the sintering operation used to make the ceramic.

Because of its low softening temperature, the glassy intergranular phase tends to lower the ceramic's high temperature creep strength. The high temperature strength of the ceramic can be increased by reducing the volume fraction of glassy phase used to densify the ceramic powders during sintering. However, compositions containing little or no glassy phase are difficult or impossible to densify.

The glassy phase contains cations and anions which affect the properties and the volume fraction of glassy phase. U.S. patent application Ser. No. 266,244, filed May 22, 1981, by Frederick F. Lange and David R. Clarke (the present inventor) describes a post fabrication oxidation heat treatment for drawing out these ions. A reaction couple is created between silicon dioxide scale on the ceramic's surface and the ions in the glassy phase within the bulk of the material. This causes the ions to diffuse out of the glassy phase and raises the high temperature strength of the glass.

In U.S. patent application Ser. No. 417,278 filed Sept. 13, 1982 by David R. Clarke (the present inventor) and Fredrick F. Lange, a method is described for fabricating an improved ceramic radome by drawing out ions in the glassy phase using the principle of the reaction couple diffusion described in the first-mentioned patent application. The inventors discovered that it is the ions in the glassy phase which reduce the dielectric properties of the ceramic at high temperature. By removing these ions, the loss tangent of the ceramic is reduced, particularly at high temperatures where the ions have greater mobility in the glassy phase.

Figure 1:
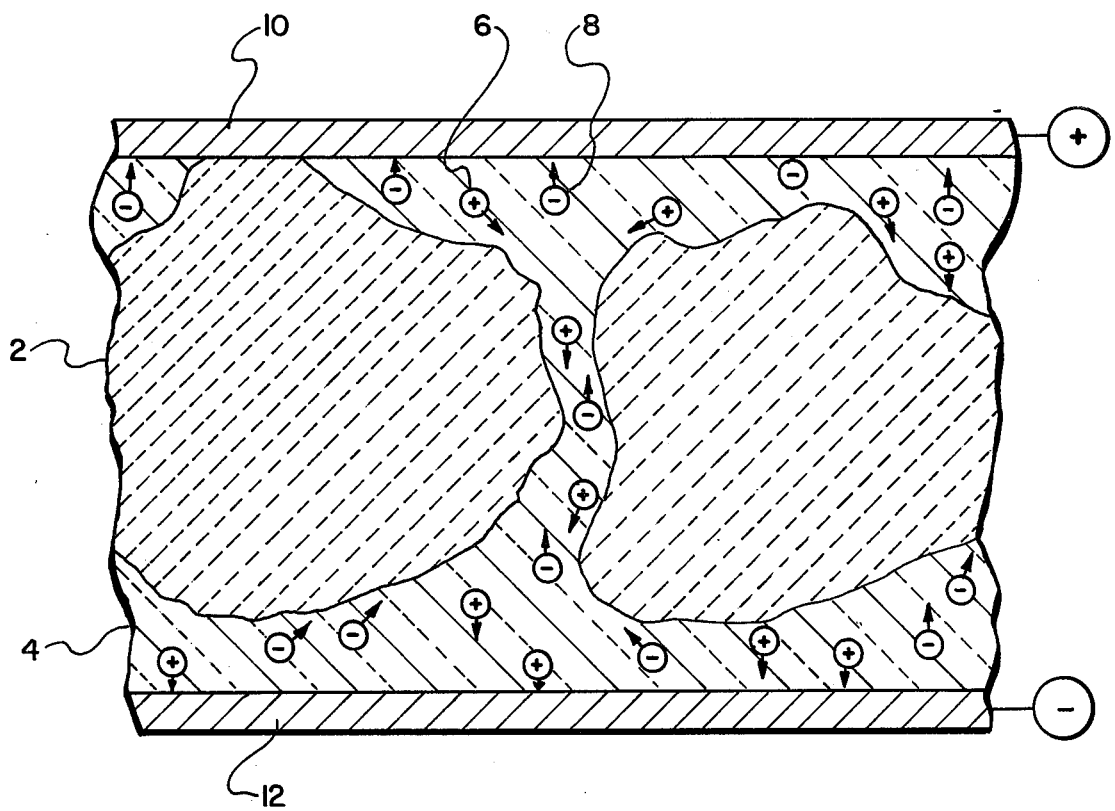
FIG. 1 is a schematic of a cross section of a silicon nitride ceramic illustrating the principle of the invention.

The present invention is a new method for drawing ions out of the glassy phase using the principle of electrolysis to attract the ions to the surface of the ceramic. FIG. 1 is a simplified cross section illustrating the principle of the invention. Crystalline grains 2 are shown surrounded by an intergranular glassy phase 4. To simplify the illustration only two grains are shown with a large volume fraction of glassy phase. In an actual ceramic there would be many grains separated by a very thin intergranular glassy phase. The glassy phase contains positively-charged ions (cations 6) and negatively charged ions (anions 8) in solution within the glassy phase. Typical cations 6 are: $Si^{+4}$, $Mg^{+2}$, $Ca^{+2}$, $Al^{+3}$, $Fe^{+2}$, and $Na^{+1}$. Typical anions 8 are $O^{-2}$ and $N^{-3}$.

A positive electrode 10 is placed in contact with one surface of the ceramic and a negative electrode 12 is placed on another surface. These electrodes can be metal deposits on the surface or conductive blocks pressed against the surface. They must be in intimate contact with the surface to prevent opposite charges from forming along the surface of the ceramic and stopping the migration of ions to the surface. Also, the material chosen to form the electrode must not have a detrimental chemical reaction with the ceramic at the temperature of the electrolysis. Molybdenum and graphite contacts have been used. Sputtered platinum has also been used, but it was kept below the temperature at which it reacts with silicon nitride to form platinum silicide.

When a positive voltage is applied to electrode 10 and a negative voltage is applied to electrode 12, oppositely charged ions 6, 8 tend to move toward them as shown by the arrows. However, at room temperature the mobility of the ions is very low, and migration, if any, is very slow. Consequently, it is necessary to heat the ceramic to a temperature at which the mobility of the ions is sufficient to permit them to move toward the electrodes.

Figure 2:
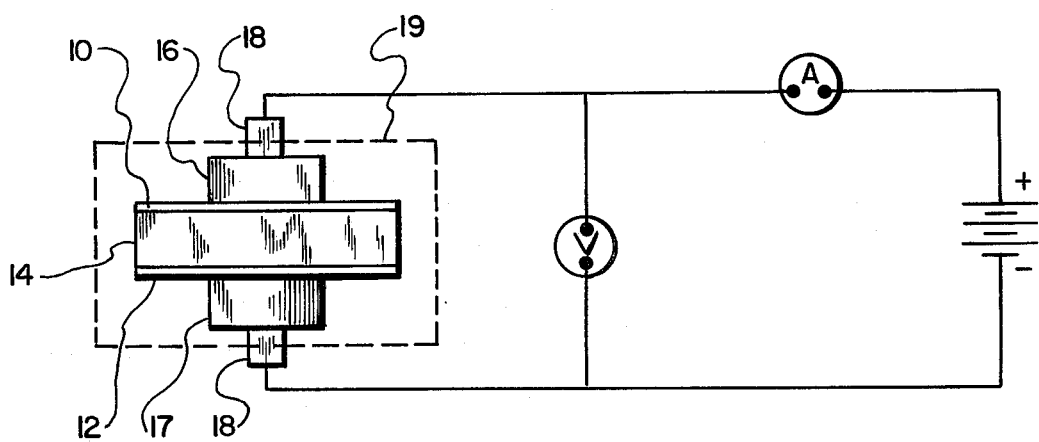
FIG. 2 is a circuit diagram showing the test set up for electrolysis of ceramics.

FIG. 2 shows a test set up used to practice the invention and to determine the temperature at which the ions migrate toward the electrodes. Electrodes 10, 12 are deposited on a ceramic 14. Molybdenum or graphite electrode blocks 16, 17 are pressed against electrodes 10, 12. This assembly is placed in the hot zone 18 of a furnace and electrical connection made through the furnace to electrode blocks 16, 17 by high temperature conducting rods 18. A voltage is applied to rods 18 by a battery or other suitable DC source.

A voltmeter is placed across the circuit to measure the applied voltage and an ammeter is placed in series to measure the flow of current across ceramic 14. Tests have shown that a small current begins to flow through a silicon nitride ceramic at a temperature of about 750° C. or higher. This indicates that at this temperature the mobility of the ions dissolved in the glassy phase has been increased sufficiently to cause significant migration and begin electrolysis.

Tests have been run on a commercially available, hot-pressed silicon nitride identified as Norton Co. NC132 and on silicon nitride samples hot pressed with MgO in the inventor's laboratory. The samples were ground to thicknesses ranging from 0.02 cm to 0.10 cm and mounted between electrode blocks 16, 17 of molybdenum or graphite. Tests were run with and without sputtered platinum electrodes 10, 12 between electrode blocks 16, 17. When platinum is used, the temperature during treatment must be kept below that at which reaction with silicon nitride occurs to form platinum silicide.

The mounted test samples were heated to temperatures of 1100°, 1200°, or 1400° C. and held at these temperatures for periods of time ranging from 10 to 100 hrs. During the heating, the samples were protected by an atmosphere of $H_2$ and $N_2$, a mixture known commercially as forming gas. Other protective gases such as inert gases or gases low in $O_2$ could be used in order to prevent the formation of a scale or oxide which could short circuit the applied electric field or draw cations toward the positive electrode as described in the previously mentioned patent application Ser. No. 266,244.

An electric field was created across the thickness of the specimens during heating by applying a dc voltage to electrode blocks 16, 17. Voltages ranging from $1.8 \times 10^4$ to $8.0 \times 10^4$ volts per meter of specimen thickness were applied.

After treatment, the specimens were examined to determine the effect of the electrolysis. In all cases, a white deposit was formed under the negative electrode while none was formed under the positive electrode. X-ray microanalysis in the scanning electron microscope showed that the white deposit was rich in the cation-forming elements magnesium, calcium, and aluminum. Magnesium is a densification aid added during fabrication of the ceramic, and calcium and aluminum are common impurities in silicon nitride ceramics. Regions outside the contact area but still on the same side of the specimen as the negative electrode did not form a white deposit and did not contain additional cation-forming elements such as magnesium, calcium, or aluminum. No cations were detected in untreated material.

X-ray diffraction of the white deposit showed that it generally contained olivene ($Mg_2SiO_4$), enstatite ($MgSiO_3$), silicon oxynitride ($Si_2N_2O$), and cristobalite ($SiO_2$). The proportions of these minerals appeared to depend upon the temperature and atmosphere used during the electrolysis treatment. By grinding the surfaces of the ceramic, the white deposit and cations and anions near the surface can be removed.

Figure 3:
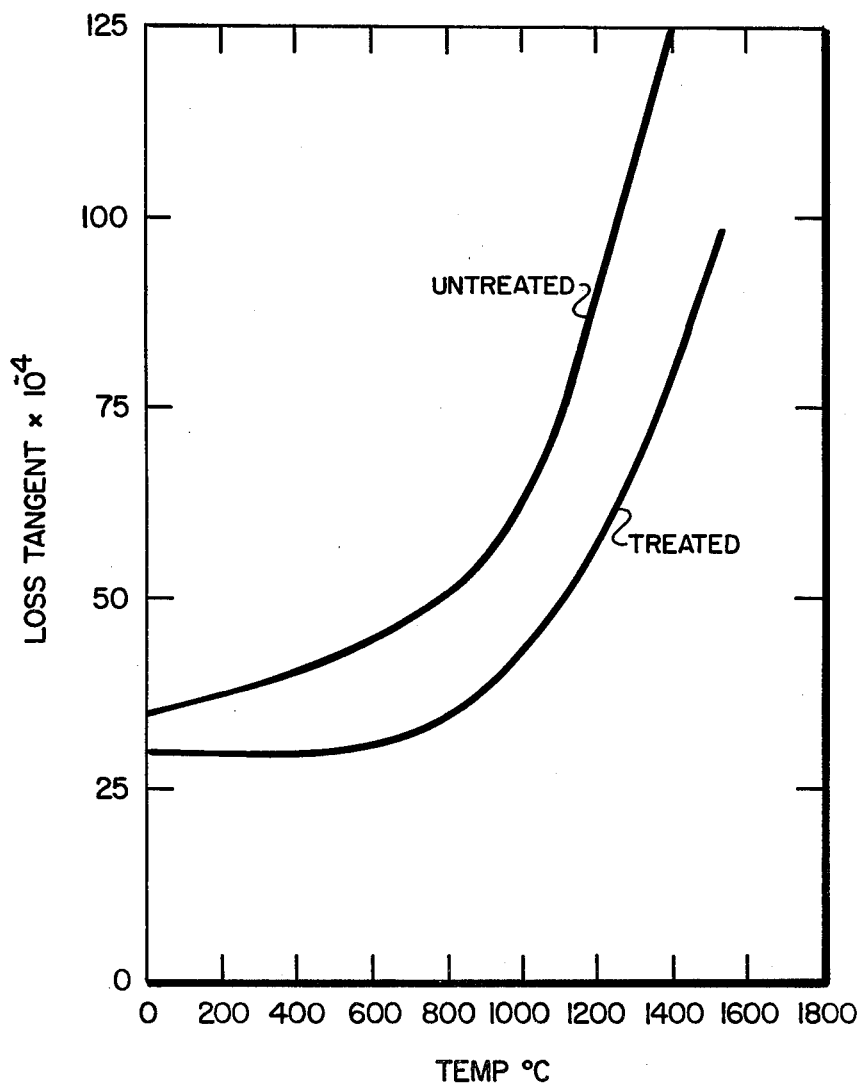
FIG. 3 is a plot of temperature vs loss tangent for a silicon nitride ceramic before and after the electrolysis treatment.

The dielectric losses at high temperatures were determined at 35 GHz for silicon nitride ceramic (NC 132) samples in the untreated condition and in the treated condition after electrolysis for 10 hours at 1200° C. in an electric field of about 7 volts per meter. As shown in FIG. 3, the electrolysis treatment reduced the loss tangent of the ceramic, particularly at high temperatures. Consequently, the treated material would be superior in applications which require a dielectric material at high temperatures, such as in a missile radome. The treated ceramic should also have improved high temperature creep strength due to the effect of withdrawing ions out of the glassy phase.

The method can be applied to any hot pressed, sintered, or hot isostatic pressed silicon nitride ceramic containing impurities and densification aids such as MgO, $Y_2O_3$, $Y_2O_3+Al_2O_3$, $Ce_2O_3$, and $TiO_2$. The method can be used in other ceramic systems which contain a continuous, intergranular glass phase, provided that the ionic impurities have sufficient mobility at the treatment temperature to cause them to move toward the electrodes under the applied electric field.

Numerous variations and modifications can be made without departing from the invention. Therefore, it should be clearly understood that the form of the invention described above is illustrative only and is not intended to limit the scope of the claims.

What is claimed is:

1. A method of drawing ions out of a ceramic which has a glassy intergranular phase, comprising the steps of:

providing a ceramic having grains of a crystalline material surrounded by a very thin non-crystalline glassy intergranular phase, said intergranular phase comprising only a few percent of the total volume of said ceramic;

heating said ceramic to a temperature at which the ions have mobility in said intergranular phase;

applying an electric field across said ceramic while said ceramic is at said temperature;

holding said ceramic at said temperature and at said field so that ions can be drawn to the sides of said ceramic under the influence of said electric field;

cooling said ceramic and removing said electric field; and removing material from the surface of said ceramic.

2. A method of drawing ions out of a silicon nitride ceramic comprising the steps of:

providing a silicon nitride ceramic having an intergranular glassy phase;

heating said ceramic to a temperature of at least 1100° C. in a substantially non-oxidizing atmosphere;

applying an electric field of at least $1.8 \times 10^4$ V m$^{-1}$ across said ceramic while said ceramic is at said temperature;

holding said ceramic at said temperature and at said field for at least 10 hours so that ions in said glassy phase are drawn to the sides of said ceramic;

cooling said ceramic and removing said electric field; and removing material from the surface of said ceramic.

3. A ceramic treated according to the method described in claims 1 or 3.

* * * * *